Aug. 3, 1937.  E. M. LONG  2,088,914
MARKING GAUGE FOR OPHTHALMIC LENSES
Filed June 30, 1936
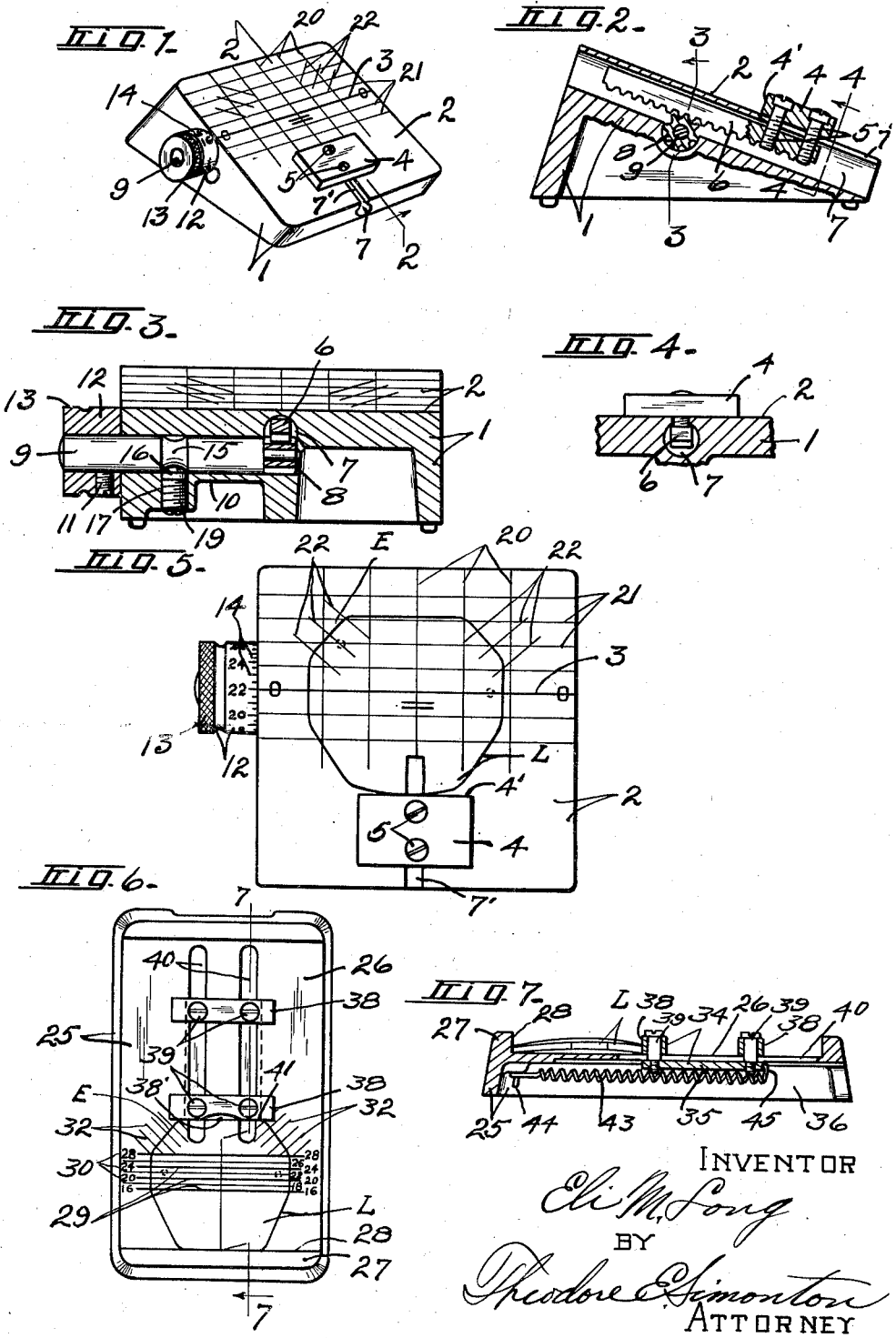

Patented Aug. 3, 1937

2,088,914

UNITED STATES PATENT OFFICE 2,088,914

MARKING GAUGE FOR OPHTHALMIC LENSES

Eli M. Long, Geneva, N. Y., assignor to Shuron Optical Company, Inc., Geneva, N. Y., a corporation of New York Application June 30, 1936, Serial No. 88,168

6 Claims. (Cl. 33—174)

This invention relates to improvements in a marking gauge to be used in locating the position of holes to be drilled in rimless ophthalmic lenses for receiving the fastening means which secure the nose or bridge piece and temple bar mounting straps to the lens.

In modern rimless lenses where the marginal edge is more or less irregular in outline or contour, it has been difficult to accurately designate the position of the holes for receiving the screws or other fastening members by which the ophthalmic mountings are secured to the lens. Particularly is this the case where the mounting straps for the temple bars are secured to the upper portions of the lenses above the optical center line thereof as in the case of Ful-Vue lenses.

The main object of this invention is to provide a simply constructed and operated marking gauge for rimless ophthalmic lenses which is readily applicable to lenses of various peripheral outlines or contours.

A more specific object of the invention is to provide a marking gauge of the above mentioned class whereby the location of the hole for receiving the fastening means by which the nose piece or bridge is secured to the lens is quickly and accurately obtained in accordance with a given chart or prescription in or near the optical center line so that the lens will be properly focused with the eye when being used.

Other objects and advantages pertaining to the specific construction and operation of the various parts of my improved marking gauge will more readily appear from the following description taken in connection with the accompanying drawing in which:

Figure 1 is a perspective view of a marking gauge embodying the various features of this invention.

Figure 2 is a longitudinal central sectional view taken substantially in the plane of the line 2—2, Figure 1.

Figure 3 is a transverse vertical sectional view taken substantially on line 3—3, Figure 2.

Figure 4 is a detail sectional view taken on line 4—4, Figure 2.

Figure 5 is a top plan view of the marking gauge illustrated in Figure 1 with a rimless lens mounted in operative relation therewith.

Figure 6 is a top plan view similar to Figure 5 illustrating a modified form of my invention.

Figure 7 is a longitudinal sectional view taken substantially on line 7—7, Figure 6.

In the preferred form of my improved marking gauge as illustrated in Figures 1 to 5, inclusive, I utilize a protractor in the form of a substantially rectangular lens supporting member or base 1, composed preferably of aluminum or other light weight material. The base 1 has the upper surface 2 thereof substantially flat for supporting the lens to be marked thereon and which is preferably arranged, as shown, slightly inclined to permit the accurate positioning of the lens on said base to be readily accomplished.

The supporting surface 2 of the protractor or base is provided with a substantially straight line 3, marked, stamped or otherwise applied thereto, to extend transversely of the surface intermediate the upper and lower edges thereof. The line 3 is for the purpose of aligning with the mounting line of the lens, and is preferably formed in the surface 2 a short distance above the center of the surface, as illustrated in Figures 1 and 5 to form what herein is designated the zero line of the protractor and by which the hole or holes to be drilled in the lens on or adjacent the mechanical or longitudinal center line of the lens may be indicated.

In order that the lens may be readily adjusted to bring the same into proper relation with the zero line 3, I have provided an adjustable lens rest or support 4 which, in this instance, is in the form of a substantially rectangular flat plate secured by screws 5 or their equivalent to a rack 6 mounted for longitudinal reciprocative movement in a recess 7 formed in the base 1 beneath the surface 2 and which extends longitudinally of the base substantially midway between the sides thereof. The lens rest 4 is arranged on the surface 2 below the zero line 3 for sliding movement toward and from said line and for this purpose, the screws or fastening means 5 extend downwardly from the support through an elongated slot 7' formed in the lower portion of the upper surface of the base in communication with recess 7. The upper longitudinal edge 4' of the rest 4 is preferably constructed to form a straight continuous surface and is arranged in parallel relation with the line 3.

The rack 6 is operated to move the rest toward and from the line 3 by means of a pinion 8 mounted upon the inner end of a shaft 9 in meshing engagement with said rack. The shaft 9, as shown in Figure 3, is journaled in a suitable bearing 10 provided in the base 1 and extends from the central portion of the base outwardly to one side thereof, and has secured to its outer end by means of a screw 11, a collar 12. The collar 12 has the outer end portion thereof knurled as at 13 to provide a convenient finger piece by which the shaft 9 may be rotated. The shaft 9 and collar 12 are arranged in the plane of the zero line 3, passing through the base 1 normal to the surface 2 and the inner peripheral edge of the collar is provided with a metric scale 14 composed of graduated marks which are adapted to successively register with the zero line 3.

The shaft 9 is provided with an annular recess 15 formed in the periphery intermediate the ends thereof for the reception of a friction disk 16 composed of leather, fibre, or other suitable material and which is mounted in a threaded opening 17 formed in the bearing member 10 in alignment with the recess 15. The disk 16 is maintained in pressure engagement with the shaft 9 by means of a screw 19 screw threaded in the opening 17.

The upper portion of the lens supporting surface 2 of base 1 is provided with a plurality of, in this instance 3, sets of guide lines 20, 21 and 22. The guide lines 20 extend longitudinally of the surface 1 in parallel spaced relation to each other and substantially normal to the zero line 3. The guide lines 21 are arranged transversely of the surface 2 in parallel spaced relation to each other and to the zero line 3. The third set of guide lines 22 is arranged above the zero line 3, and comprises two groups composed, in this instance, of three lines each. The lines of each group are arranged at equal distances either side of the longitudinal central line of the surface 2 in angular relation with the lines of the other group and with the other sets of guide lines 20 and 21, as shown in Figures 1 and 5. The vertical and horizontal sets of guide lines 20 and 21 are for the purpose of assisting in accurately positioning the lens with the longitudinal axis thereof in parallel relation with the zero line 3, while the set of guide lines 22 are for the purpose of accurately indicating the position of the hole to be drilled for the temple bar mounting strap, when said temple bar is to be connected with the upper portion of the lens as in the case of what is commonly known as a Ful-Vue lens.

To illustrate, it will be understood that when the holes for the ophthalmic mountings are to be provided in the conventional manner in the mounting line of the lens, that is, in the so-called optical center of the lens, this mounting line varies in position in different forms of lenses. If the lens is round or oval in contour, the mounting line will lie midway between the upper and lower edges of the lens. If, however, the lens is of modern design, wherein the widest portion of the lens is further from the bottom than from the top, the mounting line or so-called optical center, will likewise be positioned above the mechanical center of the lens. In either of these types of lens, the exact distance the mounting line is spaced from the bottom edge of the lens may always be determined from a previously prepared chart or prescription, as is well known.

The first step, therefore, in marking a lens is to set the lens rest or support 4 in such a position that the edge 4' thereof will be spaced from the zero line 3 a distance corresponding to the distance from the bottom of the lens to the horizontal line of the lens on which the holes are to be drilled as determined from the prescription. This setting of the lens rest 4 is readily accomplished by rotating the finger piece 13 until the graduation mark of the scale 14 corresponding to the distance in millimeters aligns with the zero line 3.

The lens as L is then placed upon the surface 2 with the lower or base edge thereof in contact with the edge 4' of the rest 4, after which the lens is manually manipulated until it is apparent by the aid of the guide lines 20 and 21 that the top edge of the lens is in parallel relation with the guide lines 21 and, therefore, with the zero line 3 or is substantially tangential to one of the guide lines 21, depending upon the contour of said edge. The upper refracting surface of the lens may then be marked adjacent either side edge thereof by tracing the zero line 3 on the superposed portion of the lens with the aid of a pen or crayon for a short distance inwardly from each of said edges. It will be understood that in drilling the lens, the lens is so positioned relative to the drill spindle that the drill will pass through the line drawn thereon by the assistance of my novel gauge, while the distance the hole is made from the edge of the lens is determined by the structure of the lens drilling machine.

In case the hole for the coupling member for the temple bar mounting strap is to be made in the upper portion of the lens as in the case of a Ful-Vue lens, the location of the hole for attaching the bridge or nose piece may be marked at one side of the lens in the manner described above after which the lens is moved sideways along the rest 4 and longitudinally of the zero line 3 until one of the diagonal lines 22 registers substantially midway between the ends of the short, straight edge E of the lens which is usually formed on the upper corner of the lens to receive the temple bar strap. This line is then traced on the superposed portion of the lens for a short distance from the edge of the lens. It will be understood that the guide lines 22 are so positioned on the base surface 2 that they will extend substantially normal to the straight portion E of the lens L when said lens is in contact with the rest 4.

In Figures 6 and 7, I have illustrated a simplified form of my novel marking gauge and which comprises a base 25 composed of any suitable material. The base has a substantially flat upper surface 26 and is provided with a fixed lens rest or support 27 secured to or made integral with the base adjacent one end of the surface 26. The lens rest 27 is provided with a substantially flat, straight inner vertical edge 28 which extends transversely of the base 25 substantially normal to the longitudinal center line of the surface 26. The surface 26 is provided with a scale 29 composed, in this instance, of seven lines formed in any suitable manner upon the surface 26 in parallel spaced relation with each other and with the surface 28 of the rest 27. These lines are arranged in predetermined spaced relation to the surface 28 and the value thereof may be indicated, as shown, by figures 30 corresponding to the distance said lines are from the surface 28. Above the scale 29 is a second scale 32 constructed similar to the scale 22 shown in Figures 1 and 5 in that it comprises two groups of guide lines arranged at opposite sides of the longitudinal center line of the surface 26 and with the lines of each group disposed in angular relation to the lines of the other group and to the lines of the scale 29.

In utilizing the marking gauge shown in Figures 6 and 7, the lens is placed upon the surface 26 with the base or lower edge thereof in contact with the surface 28. If the holes are to be drilled in the conventional manner on the mounting line, this mounting line is determined for the particular lens from the prescription and then the corresponding line of the scale 29 is traced on the superposed portion of the lens in the same manner as described above when utilizing the gauge shown in Figures 1 to 5. If, however, the temple bar is to be connected with the upper portion of the lens, the position of the hole at one side of the lens for the nose or bridge piece is first indicated by drawing a line from the edge of the lens inwardly, perhaps one quarter of an inch over the selected line on scale 29, as, for instance, line 22. The lens is next moved along the rest 27 longitudinally of the scale 29 until one of the guide lines of the scale 32 registers centrally of the flat portion E of the lens positioned opposite the inner marked edge thereof, after which the position of the hole for the mounting strap may be indicated by drawing a line on the lens over this guide line of the scale 32.

I have also illustrated the marking guide shown in Figures 6 and 7 provided with a movable lens clamp 34 which may be used for releasably securing the lens in the adjusted position against the lens rest 27. The clamp 34, in this instance, comprises a slide plate 35 mounted in a recess 36 provided in the base 25 beneath the surface 26. This plate is connected with a pair of transversely disposed bars 38 positioned adjacent the surface 26 by means of shouldered screws 39 which extend through elongated slots 40 provided in the base 25 longitudinally of the surface 26. The bars 38 are arranged one adjacent either end of the plate 35 and are adapted to be moved with said plate toward and from the lens support 27 and scale 29. The bar 38 nearest the scale 29 may, as shown, be provided with a slight recess 38' intermediate the ends thereof so as to form a pair of contacting surfaces 41, one adjacent either end of the bar, for engagement with the upper surface of the lens. The other bar 38 may be utilized as a hand piece for moving the clamp toward and from the scale 29. The clamp may, as shown, be yieldingly urged inwardly toward the scale 29 and support 27 by means of a coil spring 43 positioned in the recess 36 and which has one end thereof connected to the base 25 by a pin 44 and the other end connected as at 45 with the outer end of plate 35.

It will now be noted that while the two devices illustrated in the drawing function in a similar manner, the structure shown in Figures 1 to 5 inclusive is preferable for the reason that the movable lens rest 4 may be readily adjusted to obtain the required distance from the lens engaging surface 4' thereof to the zero line 3 for a particular type of lens and then said rest may be secured in the adjusted position by bringing the friction disk 16 into pressure engagement with the shaft 9 by the manipulation of the screw 19 so that the marking on a plurality of such lenses is determined by the single line 3 without further adjustment of the gauge.

Furthermore, as will be observed, it is much easier to use the permanent zero line 3 than to select one of the closely related lines of the scale 29 during each marking operation for the reason that the zero line 3 is not only made heavier than the parallel guide lines of the scale 21 but is also spaced a considerable distance from these guide lines so as to be readily distinguishable therefrom.

Although the devices shown and described are simple in construction and operation, I do not wish to be limited to the exact construction shown as it is obvious that certain changes in the form and relation of the parts thereof may readily be made without departing from the spirit of the invention as set forth in the appended claims.

I claim:

1. A marking instrument for ophthalmic lenses comprising a base member having a plane lens supporting surface, a lens rest movably connected with the base member and having a straight edge projecting above the supporting surface adapted to slidably engage the lower edge of a lens placed on said surface, a plurality of guide lines on said surface parallel to the straight edge of said lens rest whereby the operator is enabled visually to position the lens by moving the same along said straight edge symmetrically with respect to said guide lines, means for adjusting the lens rest toward and from the guide lines including an adjusting member operatively connected with the base member to move the same, and indicia so connected to the adjusting member and base member and arranged with respect to each other as to enable the operator to read directly from said indicia the distance between said straight edge and at least one of the parallel guide lines constituting a marking line.

2. A marking instrument as in claim 1 having means connected with the adjusting member and base member coacting to maintain the lens rest in the adjusted position.

3. In a marking instrument for an ophthalmic lens having a substantially flat edge at the upper outer corner thereof arranged at an angle to the major axis of the lens for receiving a mounting strap, in combination, a base member having a plane lens supporting surface, a lens rest movably connected with the base member and having a straight edge projecting above the supporting surface adapted to engage the lower edge of the lens to permit adjustment of said lens longitudinally of said straight edge, a plurality of guide lines on said surface parallel to the straight edge of said lens rest whereby the operator is enabled visually to position the lens symmetrically with respect to said guide lines, means for adjusting the lens rest toward and from the guide lines including an adjusting member operatively connected with the base member to move the same, indicia so associated with the adjusting member and base member as to enable the operator to read directly from said indicia the distance between said straight edge and at least one of the parallel guide lines constituting a marking line and which is adapted to align with the optical center line of the lens engaging said rest whereby the position of the drill hole for the bridge fastening means may be determined, and at least one additional guide line on said lens supporting surface arranged at an angle to the first mentioned guide lines and the straight edge and which is adapted to register with said flat edge of the lens and to extend substantially normal thereto to form a second marking line by which the position of the drill hole for the mounting strap fastening means may be determined by said adjustment of the lens longitudinally of said straight edge.

4. A marking instrument for ophthalmic lenses comprising a base member having a substantially flat lens supporting surface provided with a plurality of guide lines in one portion thereof, a lens rest movably connected with the base member having a straight edge projecting above the supporting surface adapted to engage the lower edge of the lens mounted on said surface to permit adjustment of the lens longitudinally of said straight edge, means for adjusting the lens rest toward and from the guide lines comprising a shaft journaled in the base member beneath said lens supporting surface, means operatively connecting the shaft with the lens rest, a collar connected with the shaft and having a peripheral surface thereof in registration with said lens supporting surface of the base member, and indicia connected with said lens supporting surface and collar whereby the operator is enabled to read directly from said indicia the distance between said straight edge and at least one of the guide lines constituting a marking line.

5. A marking instrument as in claim 4 having means connected with the base member and frictionally engaging said shaft for maintaining the lens rest in the adjusted position.

6. In a marking instrument for an ophthalmic lens having a substantially flat edge at the upper outer corner thereof arranged at an angle to the major axis of the lens for receiving a mounting strap, in combination, a base member having a substantially flat lens supporting surface, a plurality of guide lines on said surface arranged in parallel spaced relation to each other, a lens rest connected with the base member and having a straight edge projecting above the supporting surface adapted to engage the lower edge of a lens mounted on said surface to permit adjustment of the lens longitudinally of said straight edge, said straight edge being arranged in parallel predetermined spaced relation with at least one of said guide lines constituting a marking line and which is adapted to align with the optical center line of a lens engaging said rest whereby the position of the drill hole for the bridge fastening means may be determined, and additional guide lines on said lens supporting surface arranged in parallel relation with each other and at an angle to the first mentioned guide lines and said straight edge, said latter guide lines being adapted to register with said flat edge of the lens and to extend substantially normal thereto whereby at least one of said latter guide lines may form a marking line by which the position of the drill hole for the mounting strap fastening means may be determined by said adjustment of the lens longitudinally of the straight edge.

ELI M. LONG.